(12) United States Patent
Kwon et al.

(10) Patent No.: US 8,274,944 B2
(45) Date of Patent: Sep. 25, 2012

(54) METHOD AND APPARATUS FOR ALLOCATING COMMUNICATION RESOURCES USING VIRTUAL CIRCUIT SWITCHING IN A WIRELESS COMMUNICATION SYSTEM AND METHOD FOR TRANSMITTING AND RECEIVING DATA IN A MOBILE STATION USING THE SAME

(75) Inventors: Hwan-Joon Kwon, Hwaseong-si (KR); Sung-Ho Choi, Suwon-si (KR); Ju-Ho Lee, Suwon-si (KR); Jin-Kyu Han, Seoul (KR); Seung-Kyun Oh, Suwon-si (KR); Youn-Hyoung Heo, Suwon-si (KR); Yu-Chul Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 12/974,875

(22) Filed: Dec. 21, 2010

(65) Prior Publication Data
US 2011/0090858 A1 Apr. 21, 2011

Related U.S. Application Data

(63) Continuation of application No. 11/501,231, filed on Aug. 9, 2006, now Pat. No. 7,948,941.

(30) Foreign Application Priority Data

Aug. 9, 2005 (KR) .................................. 2005-72782
Mar. 31, 2006 (KR) .................................. 2006-29938

(51) Int. Cl.
*H04W 4/00* (2009.01)

(52) U.S. Cl. ........ 370/329; 370/328; 370/338; 370/341; 370/310; 455/450; 455/452.1; 455/455

(58) Field of Classification Search .................. 455/434, 455/450, 451, 452.1–453, 455; 370/310–338
See application file for complete search history.

(56) References Cited

U.S. PATENT DOCUMENTS

| 6,452,924 | B1 | 9/2002 | Golden et al. |
| 6,469,994 | B1 | 10/2002 | Ueda |
| 6,549,530 | B1 * | 4/2003 | Cable et al. ................... 370/347 |
| 6,771,618 | B1 | 8/2004 | Ueda |
| 6,870,824 | B1 * | 3/2005 | Kim et al. ..................... 370/342 |

(Continued)

FOREIGN PATENT DOCUMENTS

| CN | 1428031 A | 7/2003 |
| EP | 1067810 A2 | 1/2001 |

(Continued)

*Primary Examiner* — Kathy Wang-Hurst
(74) *Attorney, Agent, or Firm* — Roylance, Abrams, Berdo & Goodman, LLP

(57) ABSTRACT

A method and apparatus using Virtual Circuit Switching (VCS) in a new scheme are provided for allocating and employing resources by combining Circuit Switching (CS) and Packet Switching (PS), in which a base station allocates resources of a dedicated channel using the CS to a user and then transmits data on the dedicated channel. When data is not transmitted to the user, the base station allocates the allocated dedicated channel resources for resources of a shared channel and transmits data of a different user. Therefore, system capacity can be increased and a waste of communication resources can be minimized in a wireless communication system for frequently transmitting a small amount of traffic that is sensitive to a delay time.

2 Claims, 11 Drawing Sheets

U.S. PATENT DOCUMENTS

| | | |
|---|---|---|
| 6,931,026 B1 | 8/2005 | Lee |
| 7,050,407 B1 | 5/2006 | Frazer et al. |
| 7,574,224 B2 * | 8/2009 | Lane et al. .................... 455/502 |
| 7,688,798 B2 * | 3/2010 | Dottling et al. ............... 370/345 |
| 2002/0051462 A1 | 5/2002 | Ertel |
| 2003/0236094 A1 | 12/2003 | Jami et al. |
| 2005/0041618 A1 | 2/2005 | Wei et al. |
| 2006/0176839 A1 | 8/2006 | Frazer et al. |
| 2007/0259668 A1 * | 11/2007 | Legg ............................ 455/450 |
| 2007/0274265 A1 * | 11/2007 | Yoon et al. .................... 370/335 |

FOREIGN PATENT DOCUMENTS

| | | |
|---|---|---|
| JP | 2001-024706 A | 1/2001 |
| JP | 2003-535502 A | 11/2003 |
| JP | 2004-247950 A | 9/2004 |
| JP | 2005-073087 A | 3/2005 |
| KR | 1019990083195 A | 11/1999 |
| KR | 1020000005807 A | 1/2000 |
| KR | 2005-0038978 | 4/2005 |
| RU | 2001115687 | 7/1999 |
| RU | 2241316 C2 | 11/2004 |
| WO | WO 00-22788 A1 | 4/2000 |
| WO | WO 0193505 A2 | 12/2001 |
| WO | WO 2004-028041 A1 | 4/2004 |
| WO | WO 2005-009070 A1 | 1/2005 |

* cited by examiner

METHOD AND APPARATUS FOR ALLOCATING COMMUNICATION RESOURCES USING VIRTUAL CIRCUIT SWITCHING IN A WIRELESS COMMUNICATION SYSTEM AND METHOD FOR TRANSMITTING AND RECEIVING DATA IN A MOBILE STATION USING THE SAME

CROSS-REFERENCE TO RELATED PATENT APPLICATION

This application is a continuation of U.S. patent application Ser. No. 11/501,231, filed Aug. 9, 2006, now U.S. Pat. No. 7,948,941 which claims the benefit under 35 U.S.C. §119(a) of Korean Patent Applications filed in the Korean Intellectual Property Office on Aug. 9, 2005, and Mar. 31, 2006, and bearing Serial Nos. 2005-72782 and 2006-29938, respectively, which are all incorporated herein by reference.

BACKGROUND OF THE INVENTION

1. Field of the Invention

The present invention generally relates to a method and apparatus for allocating communication resources in a wireless communication system. More particularly, the present invention relates to a method and apparatus for efficiently allocating and employing communication resources in a wireless communication system using circuit switching and packet switching and a method for transmitting and receiving data in a mobile station using the same.

2. Description of the Related Art

Conventionally, communication resource allocation schemes for use in a wireless communication system are classified into two schemes of Circuit Switching (CS) and Packet Switching (PS). In the CS scheme, a fixed amount of radio resources, that is, a dedicated channel, is allocated to a particular user and data is transmitted and received using the dedicated channel.

FIG. 1 is a flowchart illustrating a process for transmitting data using the conventional CS scheme. An example of the conventional CS scheme for use in a transmitter of a Base Station (BS) for allocating a dedicated channel will be briefly described with reference to FIG. 1.

In step 101 of FIG. 1, the transmitter of the BS allocates the dedicated channel by performing a scheduling process for allocating communication resources to a particular user linked through a radio network. In a typical example of step 101, a particular Walsh code for identifying a channel is allocated to the particular user in a wireless communication system using Code Division Multiple Access (CDMA). In another example, particular subcarrier resources are allocated to the particular user in a wireless communication system using Orthogonal Frequency Division Access (OFDMA).

To allocate the dedicated channel, the operation for allocating the particular Walsh code or the particular subcarrier resources to the particular user is conventionally performed in a call setup or handoff process. In FIG. 1, steps 103, 105 and 107 are processes for transmitting data on the allocated dedicated channel while a call of the particular user is connected. That is, in step 103, the transmitter of the BS determines whether there is data to be transmitted to a user connected by CS (hereinafter, referred to as a CS user) for which the dedicated channel has been allocated in step 101 in an associated transmission interval. Herein, the transmission interval means a Transmission Time Interval (TTI) or frame serving as a time unit in which data of one packet is transmitted.

If data to be transmitted to the associated CS user is present in this transmission interval as a determination result of step 103, the transmitter of the BS transmits data on the dedicated channel allocated to the CS user in step 105. However, if data to be transmitted to the associated CS user is not present in this transmission interval as the determination result of step 103, the transmitter of the BS proceeds to step 105 to move to the next transmission interval. Then, the transmitter of the BS again determines whether data to be transmitted to the associated CS user is present in step 103. Until a call is terminated, the process is repeated. The communication resource allocation process based on the CS in FIG. 1 has a problem in that a dedicated channel allocated to the particular user cannot be allocated to a different user in the same transmission interval when data to be transmitted to the particular CS user is not present in the associated transmission interval.

FIG. 2 is a flowchart illustrating a process for transmitting data using the conventional PS scheme. An example of the conventional PS scheme for use in a transmitter of a BS for allocating a shared channel will be briefly described with reference to FIG. 2.

The PS scheme employs shared system resources (for example, Walsh codes of a CDMA system, subcarriers of an OFDMA system, and the like) without allocating a dedicated channel to a particular user, which is different from the CS scheme. That is, the wireless communication system using the PS scheme performs a scheduling process by determining whether to allocate system resources to a certain user in every transmission time. In step 201 of FIG. 2, the transmitter of the BS performs a scheduling process by determining whether to transmit data to a certain user in this transmission interval through an internal scheduler (not illustrated) and then allocates a shared channel to the associated user. According to a scheduling result, multiple users can be simultaneously assigned the shared channel.

An amount of user-by-user transmission data and an amount of communication resources required for a data transmission are set in the scheduling process of step 201. In step 203, the transmitter of the BS not transmits data on the shared channel allocated to the user according to the scheduling result, but also transmits shared channel control information on a Shared Control Channel (SCCH) such that the shared channel can be received. Conventionally, the shared channel control information includes a user Identifier (ID), resource information, data rate information, modulation information, coding information, and the like.

The user ID is assigned to a user in a call setup or handoff process. A Mobile Station (MS) detects the user ID from the shared control channel. When multiple users simultaneously receive the shared channel, the MS can detect its own transmitted data in an associated transmission interval. The resource information is about communication resources used for a data transmission. The data rate information indicates a transmission rate of data to be transmitted in each transmission interval. The modulation information indicates a modulation scheme used to transmit data such as Quadrature Phase Shift Keying (QPSK), 8-Phase Shift Keying (8PSK), and 16-Quadrature Amplitude Modulation (16QAM), and the like. The coding information indicates a coding method and a code rate used in a transmission process.

After transmitting control information and data on the shared control channel and the shared channel in step 203, the transmitter of the BS moves to the next transmission interval in step 205 and repeats the process from step 201 until a call is terminated.

The above-described CS or PS scheme has the following advantages and disadvantages.

First, the CS scheme is advantageous in that an amount of control information for data to be transmitted is reduced because a dedicated channel is allocated and the data is transmitted on the dedicated channel. However, the CS scheme is disadvantageous in that the efficiency of using communication resources is degraded because a different user cannot employ resources of the associated dedicated channel when there is not data to be transmitted to a user to which the dedicated channel is allocated. Further, the PS scheme is advantageous in that the throughput of a wireless communication system in which available communication resources are limited can be improved by selecting a user with a better radio channel environment, scheduling radio channel allocation, and maximizing channel-dependent scheduling gain. However, the PS scheme is disadvantageous in that a significant amount of control information should be transmitted together with data in every time because the shared channel is used. In the CS scheme, it is difficult for the channel-dependent scheduling gain guaranteed in the PS scheme to be expected.

For example, one of communication services to which the CS or PS scheme is applicable is a Voice over Internet Protocol (VoIP) service proposed to provide a voice service through an IP network. With the development of the IP network such as the Internet, the VoIP service can provide high-quality voice communication by overcoming a voice bandwidth of 56 kbps of a transmission circuit network. In the VoIP service, an overseas call can cost-effectively be used when a fee for using the Internet is paid. Further, the VoIP service can provide various application solutions and additional services. Thus, the number of users of the VoIP service is rapidly increasing.

FIG. 3 illustrates a process for transmitting voice traffic in the conventional VoIP service.

In FIG. 3, reference numeral 301 denotes an output of a vocoder for encoding an analog voice signal into a digital voice signal. As illustrated in FIG. 3, an ON period and an OFF period are divided according to whether the output of the vocoder is an output of a sound interval in which a user speaks or an output of a mute interval in which the user does not speak. A small amount of data is continuously generated in a short period (for example, 20 ms) in the conventional voice traffic. Thus, when the VoIP traffic arrives at a BS through an IP network, a received signal is irregular because VoIP packets have different IP network delay times as indicated by reference numeral 302.

The above-described CS or PS scheme is used to transmit a VoIP packet. A system for transmitting a VoIP packet in the CS scheme may not efficiently employ communication resources because a waste of communication resources is large during the OFF period as indicated by reference numeral 301 of FIG. 3. On the other hand, a system for transmitting a VoIP packet in the PS scheme transmits the VoIP packet with a small amount of data in a short period. In this case, there is a problem in that data should be transmitted together with control information for a packet reception in every time because of irregular characteristics as indicated by reference numeral 302 of FIG. 3.

Accordingly, there is a need for an improved method and apparatus for increasing system capacity and minimizing communication resources in a wireless communication system.

SUMMARY OF THE INVENTION

An aspect of exemplary embodiments of the present invention is to address at least the above problems and/or disadvantages and to provide at least the advantages described below. Accordingly, an aspect of exemplary embodiments of the present invention is to provide a method and apparatus for allocating communication resources using virtual circuit switching that can efficiently allocate and employ communication resources in a wireless communication system using circuit switching and packet switching.

It is another aspect of exemplary embodiments of the present invention to provide a method and apparatus for allocating communication resources using virtual circuit switching that can minimize a waste of communication resources in a wireless communication system for frequently transmitting traffic of a small amount of data with an irregular delay time.

It is yet another aspect of exemplary embodiments of the present invention to provide a method and apparatus for transmitting and receiving data in a mobile station using virtual circuit switching that can efficiently allocate and employ communication resources in a wireless communication system using circuit switching and packet switching.

In accordance with an aspect of exemplary embodiments of the present invention, there is provided a method for allocating communication resources to transmit data to multiple user Mobile Stations (MSs) in a wireless communication system, in which a dedicated channel is allocated to a particular user MS; whether data to be transmitted to the particular user MS is present is determined; and resources of the dedicated channel are allocated for resources of a shared channel when the data to be transmitted to the particular user MS is not present.

In accordance with another aspect of exemplary embodiments of the present invention, there is provided a method for allocating communication resources to transmit data to multiple user Mobile Stations (MSs) in a wireless communication system, in which a dedicated channel is allocated to a particular user MS; and a shared channel is additionally allocated to the particular MS when an amount of data to be transmitted to the particular user MS is more than capacity of the allocated dedicated channel.

In accordance with another aspect of exemplary embodiments of the present invention, there is provided an apparatus for allocating communication resources to transmit data from a Base Station (BS) to multiple user Mobile Stations (MSs) in a wireless communication system, in which a data buffer temporarily stores user-by-user data to be transmitted to the multiple user MSs; a resource allocator performs a scheduling process for allocating a dedicated channel to a particular user MS and allocating resources of the dedicated channel for resources of a shared channel when data to be transmitted to the particular user MS is not present; and a transmitter transmits the user-by-user data output from the data buffer on radio channels allocated to users in a designated interval according to a scheduling result.

In accordance with another aspect of exemplary embodiments of the present invention, there is provided a method for receiving data in a user Mobile Station (MS) of a wireless communication system, in which allocation of a dedicated channel is received for receiving data from a Base Station (BS); a shared control channel is monitored and control information is received for the data reception; and data transmitted on the dedicated channel is received and the data from the shared channel is received when determining that the data of the MS is transmitted on the shared channel according to a result of receiving the control information.

In accordance with another aspect of exemplary embodiments of the present invention, there is provided an apparatus for receiving data from a Base Station (BS) in a user Mobile Station (MS) of a wireless communication system, in which a control channel demodulator demodulates a downlink signal and receives control information relating to a shared channel; a data channel demodulator demodulates a signal received from a radio channel and outputs packet data; and a data demodulation controller controls a reception of a dedicated channel and controls the data channel demodulator to demodulate a signal received from the shared channel when determining that data of the MS is transmitted on the shared channel according to a result of receiving the control information.

In accordance with another aspect of exemplary embodiments of the present invention, there is provided a method for transmitting data in a Mobile Station (MS) of a wireless communication system, in which allocation of a dedicated channel for a data transmission is received from a Base Station (BS); a shared control channel is monitored and control information is received for the data transmission; whether resources of the dedicated channel are allocated to a different user MS is determined through the control information; and the data transmission is performed using remaining resources obtained by excluding resources of persistent resource allocation from the resources of the dedicated channel when resource allocation for the different user MS is the persistent resource allocation.

In accordance with yet another aspect of exemplary embodiments of the present invention, there is provided an apparatus for transmitting data from a Mobile Station (MS) to a Base Station (BS) in a wireless communication system, in which a control channel demodulator demodulates a downlink signal and receives control information relating to a shared channel; a data channel modulator modulates a signal to be transmitted to a radio channel and outputs the modulated signal; and a data modulation controller determines whether resources of a dedicated channel is allocated for a different user MS according to a result of receiving the control information and controlling the data channel modulator to perform a data transmission using remaining resources obtained by excluding resources of persistent resource allocation from the resources of the dedicated channel when resource allocation for the different user MS is the persistent resource allocation.

BRIEF DESCRIPTION OF THE DRAWINGS

The above and other objects, features and advantages of certain exemplary embodiments of the present invention will be more apparent from the following detailed description taken in conjunction with the accompanying drawings, in which.

Throughout the drawings, the same drawing reference numerals will be understood to refer to the same elements, features, and structures.

DETAILED DESCRIPTION OF EXEMPLARY EMBODIMENTS

The matters defined in the description such as a detailed construction and elements are provided to assist in a comprehensive understanding of exemplary embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

First, a basic concept and terminology defined in exemplary embodiments of the present invention will be briefly described.

A basic method for allocating communication resources in the present invention will be described. When a Circuit Switching (CS) scheme for allocating a dedicated channel and a Packet Switching (PS) scheme for allocating a shared channel are used, the dedicated channel is allocated to a particular user as in the conventional CS scheme and then the data of the particular user is transmitted on the allocated dedicated channel when data to be transmitted to the particular user is present in a transmission interval. When data to be transmitted to the particular user is not present, communication resources allocated to the associated dedicated channel are switched to resources of a shared channel of the PS scheme, such that they are used to transmit data of a different user. When the communication resource allocation scheme is used, communication resources of the dedicated channel are allocated for shared channel resources in a transmission interval in which a data transmission is absent, such that the efficiency of using communication resources can be improved.

The communication resource allocation scheme is defined as Virtual Circuit Switching (VCS). Exemplary embodiments of the present invention will be described in which an amount of transmission control information is reduced and a dedicated channel and/or a shared channel are transmitted and received in the VCS scheme when a transmission time of an initial transmission packet is defined and a small amount of traffic is frequently transmitted.

Figure 1:
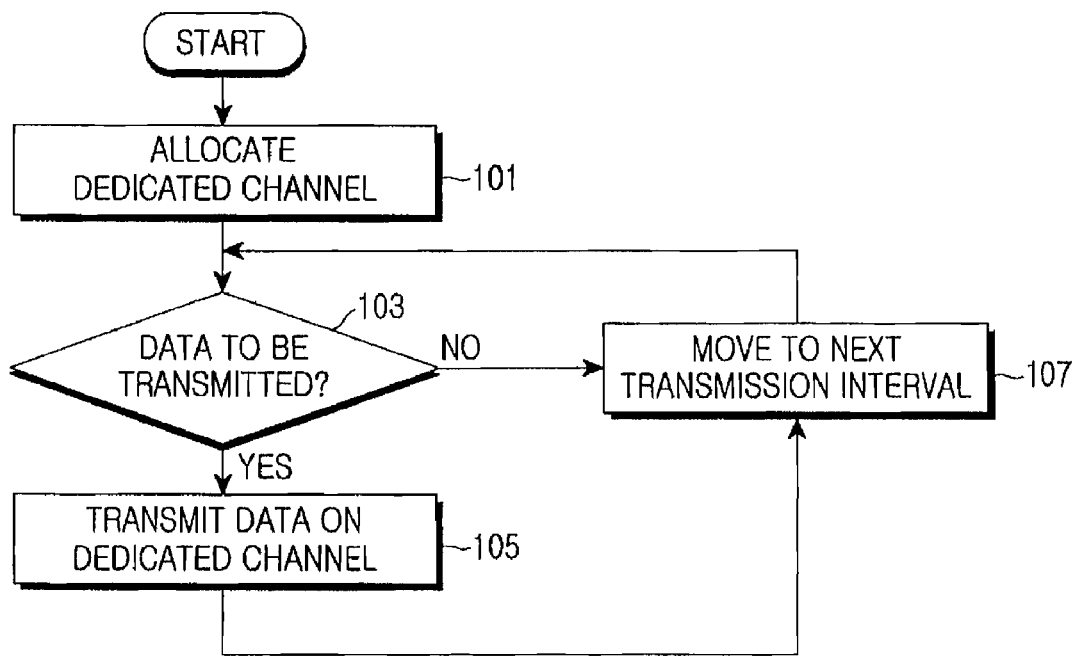
FIG. 1 is a flowchart illustrating a process for transmitting data using conventional Circuit Switching (CS)
Figure 2:
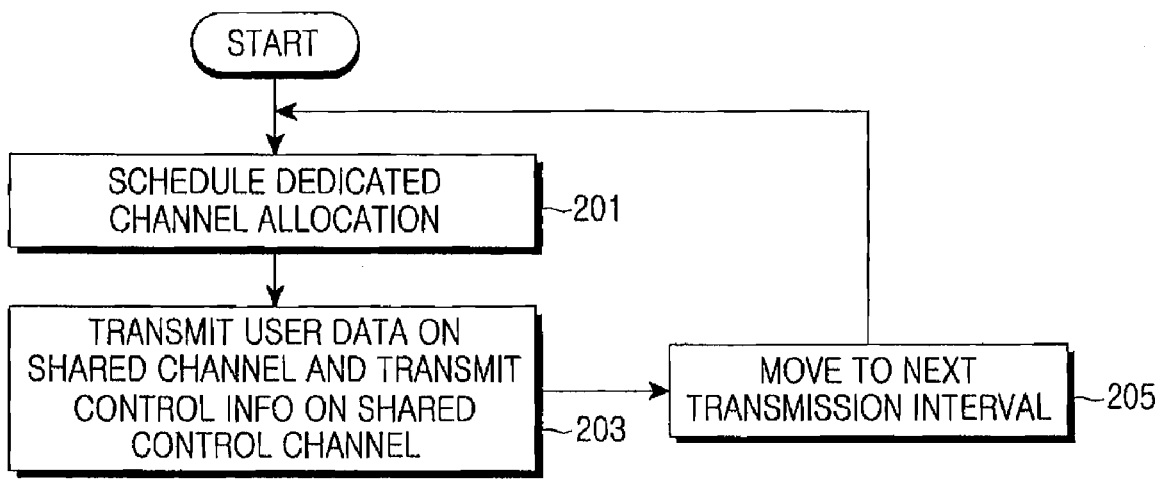
FIG. 2 is a flowchart illustrating a process for transmitting data using conventional Packet Switching (PS)
Figure 3:
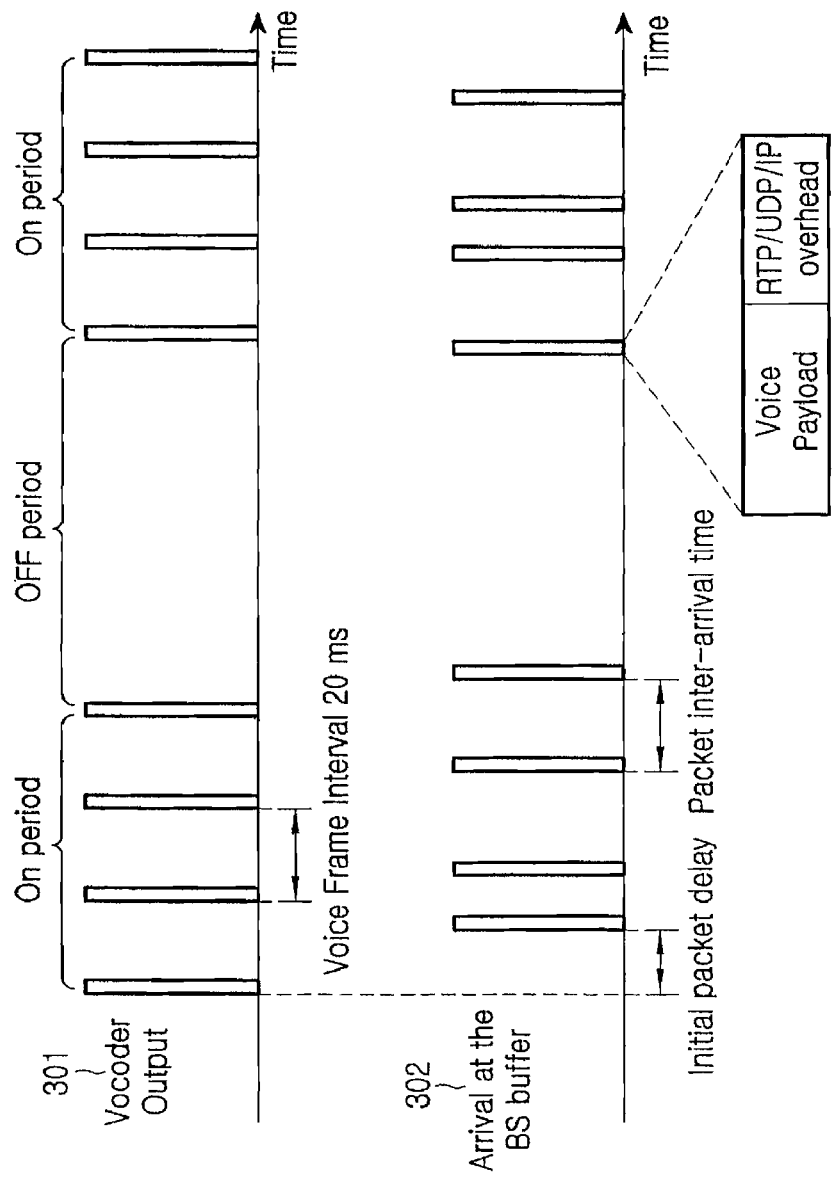
FIG. 3 illustrates a process for transmitting voice traffic in a conventional Voice over Internet Protocol (VoIP) service.
Figure 4:
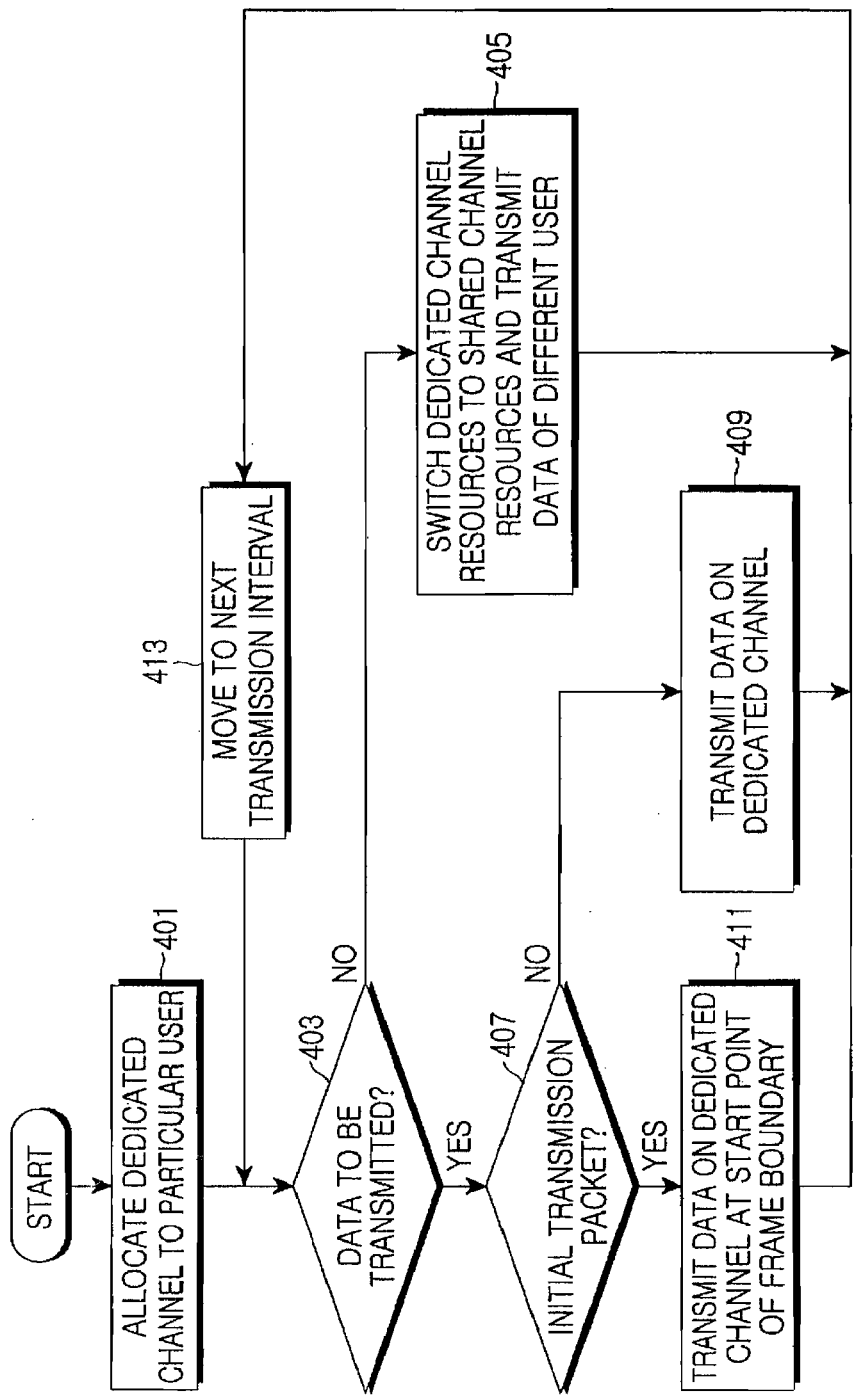
FIG. 4 is a flowchart illustrating a method for allocating communication resources using Virtual Circuit Switching (VCS) in accordance with an exemplary embodiment of the present invention.

FIG. 4 is a flowchart illustrating a method for allocating communication resources using the VCS scheme in accordance with an exemplary embodiment of the present invention. FIG. 4 illustrates an example of allocating and employing communication resources in the VCS scheme in a transmitter of a Base Station (BS).

In step 401 of FIG. 4, the transmitter of the BS allocates the dedicated channel by performing a scheduling process for allocating communication resources to a particular user linked through a radio network. For example, to allocate the dedicated channel, a particular Walsh code for identifying a channel is allocated to a particular user in a wireless communication system using Code Division Multiple Access (CDMA), and particular subcarrier resources are allocated to a particular user in a wireless communication system using Orthogonal Frequency Division Access (OFDMA). To allocate the dedicated channel, the process for allocating the particular Walsh code or subcarrier resources to the particular user is conventionally performed in a call setup or handoff process.

Figure 5:
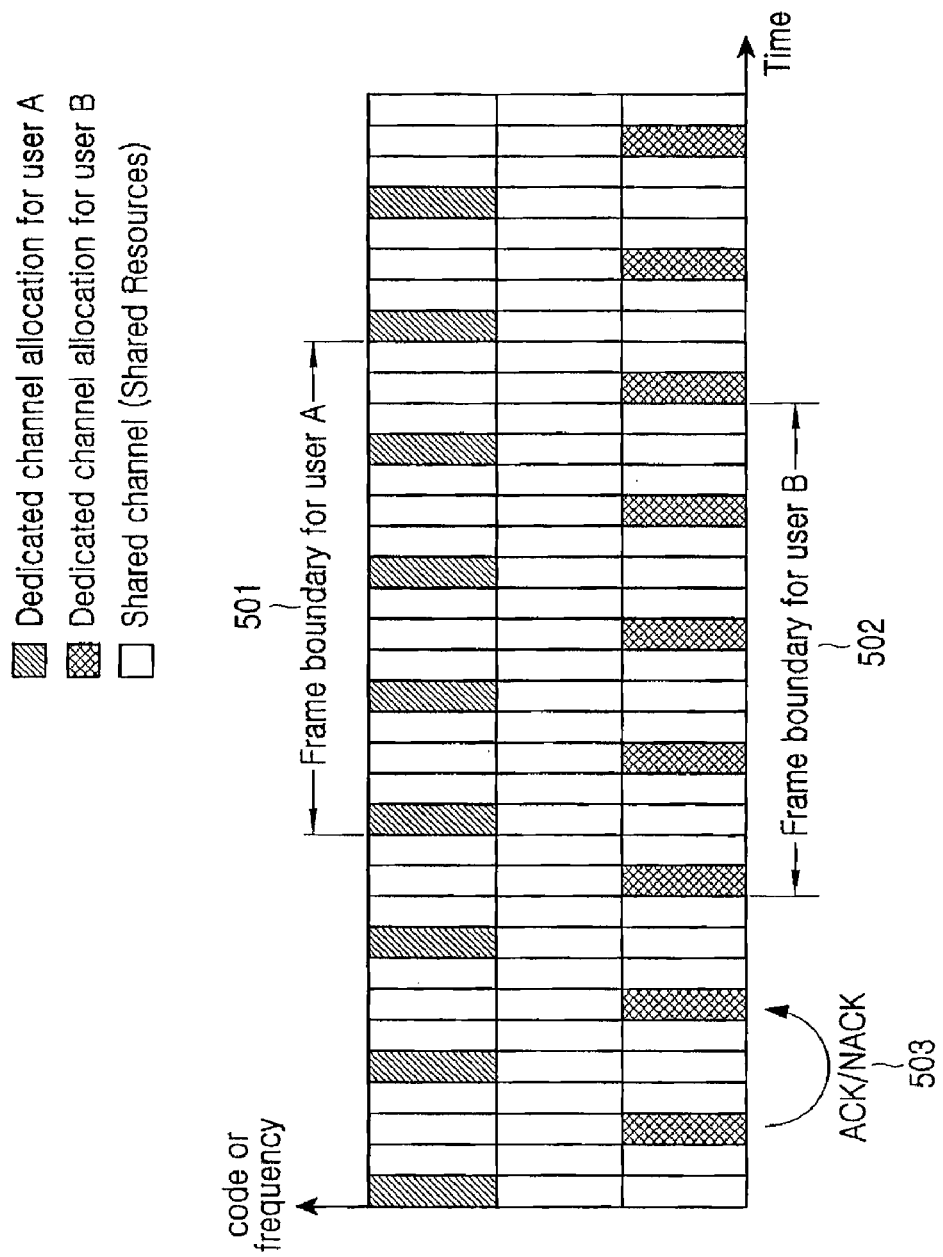
FIG. 5 illustrates an example of allocating dedicated channel resources from a base station to two users in FIG. 4.

On the other hand, FIG. 5 illustrates an example of allocating dedicated channel resources from the BS to two Users A and B in step 401 of FIG. 4. In FIG. 5, the horizontal axis represents time and the vertical axis represents communication resources. In the CDMA system, the communication resources represent Walsh codes. In the OFDMA system, the communication resources represent subcarriers. In FIG. 5, an upper shaded portion indicates dedicated communication resources allocated to User A and a lower shaded portion indicates dedicated communication resources allocated to User B. A portion between the shaded portions indicates communication resources for which a dedicated channel is not allocated but a shared channel is allocated.

In step 403 of FIG. 4, the transmitter of the BS determines whether there is data to be transmitted to a CS user to which a dedicated channel is allocated in this transmission interval. Herein, the transmission interval may be a Transmission Time Interval (TTI) or frame serving as a time unit in which data of one packet is transmitted, or may be a factor for separating different time intervals in which data is transmitted in a communication system. If data to be transmitted to the CS user is determined to be absent in this transmission interval in step 403, the transmitter of the BS switches dedicated channel resources allocated to the CS user to shared channel resources during the associated transmission interval. Then, the transmitter of the BS transmits data of a different PS user on the shared channel in step 405. In this case, control information for data demodulation of the shared channel can be sent together with a data transmission through the shared channel. However, when a receiver of a Mobile Station (MS) already knows content of the control information, the control information may not need to be sent.

If data to be transmitted to the associated CS user is present in this transmission interval as a determination result of step 403, the transmitter of the BS determines whether a data packet to be transmitted is an initial transmission packet in step 407. If the data packet to be transmitted is not the initial transmission packet, data is transmitted on the allocated dedicated channel as in the conventional CS scheme. On the other hand, if the data packet to be transmitted is determined to be the initial transmission packet in step 407, the transmitter of the BS transmits data on the allocated dedicated channel at a start point of a frame boundary. After transmitting data on the dedicated channel in step 409 or 411, the transmitter of the BS moves to the next transmission interval in step 413, determines whether there is data to be transmitted to the associated CS user, and repeats the above process until a call is terminated.

Next, the operation of steps 407 and 411 will be described in detail with reference to FIG. 5. First, when dedicated channel resources are allocated in the present invention, unique frame boundaries are set on a user-by-user basis as indicated by reference numerals 501 and 502 to make a limitation such that an initial transmission packet can be transmitted at a start point of a frame boundary in a system for supporting a Hybrid Automatic Repeat Request (HARQ).

The system for supporting the HARQ divides and transmits one encoder packet many times in an initial transmission, a first retransmission, a second retransmission, and the like. In an exemplary implementation, each transmission is referred to as a subpacket transmission. The transmitter of the BS transmits each retransmission identifier, that is, a subpacket identifier serving as control information for notification of a sequence number of each subpacket transmission to a receiver of a MS.

As described above, the user-by-user unique frame boundaries are defined to minimize an amount of control information by performing an initial transmission at the start point of the frame boundary for an associated user when a subpacket is transmitted to each user. For reference, when a unique frame boundary for a user is defined with respect to a general packet and an initial transmission is performed at a start point of the frame boundary, a packet delay time increases and therefore an adverse effect is caused. However, when a packet with a small amount of data such as VoIP traffic is transmitted in a short period, an amount of control information can be reduced in the present invention.

In FIG. 4, an HARQ based process as indicated by reference numeral 503 of FIG. 5 can allocate dedicated channel resources at an equal interval while considering an Acknowledgement/Negative Acknowledgement (ACK/NACK) from a physical layer of a MS. When data to be transmitted to the CS user is absent in FIG. 4, dedicated channel resources allocated in an associated transmission interval are switched to shared channel resources and are employed in a data transmission for a different PS user. It should be noted that the operation of steps 407 and 411 can be optionally performed to reduce an amount of transmission control information in the communication system supporting the HARQ when an initial transmission is started in a frame boundary as in steps 407 and 411.

Figure 6:
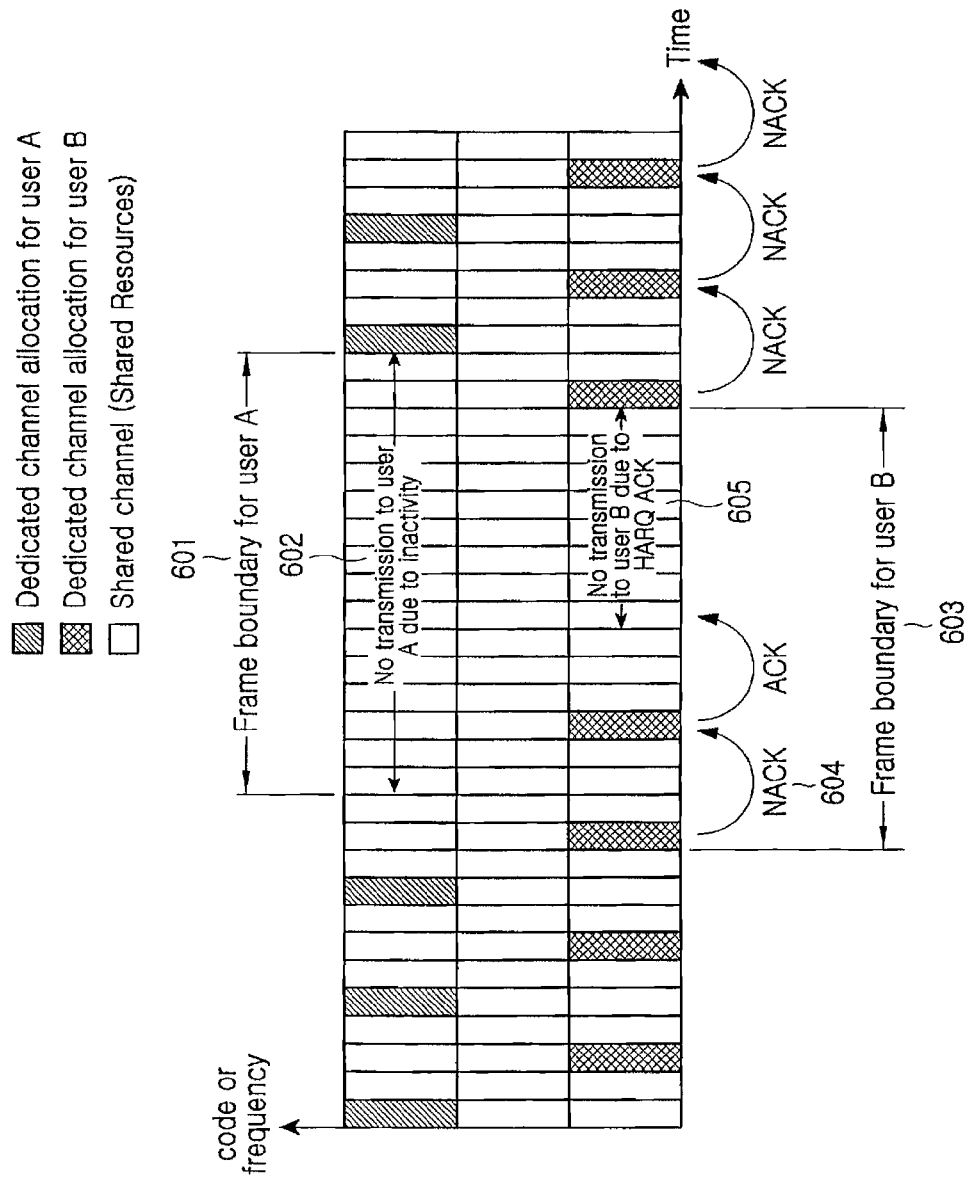
FIG. 6 illustrates a process for allocating dedicated channel resources for shared channel resources in accordance with an exemplary embodiment of the present invention.

FIG. 6 illustrates a process for allocating dedicated channel resources for shared channel resources in accordance with an exemplary embodiment of the present invention.

In FIG. 6, the horizontal axis represents time and the vertical axis represents communication resources. In the CDMA system, the communication resources represent Walsh codes. In the OFDMA system, the communication resources represent subcarriers. In FIG. 6, an upper shaded portion indicates dedicated communication resources allocated to User A and a lower shaded portion indicates dedicated communication resources allocated to User B. A portion between the shaded portions indicates communication resources for which a dedicated channel is not allocated but a shared channel is allocated.

Reference numeral 601 of FIG. 6 denotes a unique frame boundary for User A, which is indicated similarly by reference numeral 501 of FIG. 5. Reference numeral 602 of FIG. 6 denotes a state in which dedicated channel resources for User A are allocated for shared channel resources capable of being employed by a different user when data to be transmitted to User A is absent in an associated transmission interval, and corresponds to the operation of step 405 of FIG. 4.

Reference numeral 603 of FIG. 6 denotes a unique frame boundary for User B, which is indicated similarly by reference numeral 502 of FIG. 5. Reference numeral 605 of FIG. 6 denotes a state in which dedicated channel resources for User B are allocated as shared channel resources for a different user when data to be transmitted to User B is absent in an associated transmission interval as indicated by reference numeral 604. This state corresponds to the case where a retransmission is no longer required because an initial transmission has been started at a frame boundary start point for User B and an ACK response has been received from a MS in a second transmission of a packet to be transmitted to User B.

Figure 7:
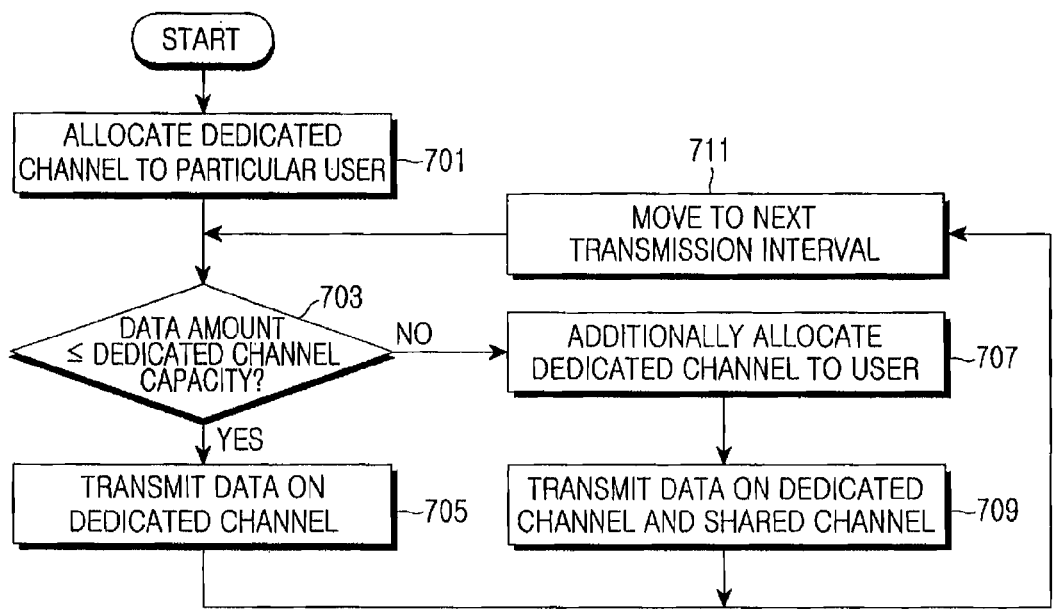
FIG. 7 is a flowchart illustrating a method for allocating communication resources using the VCS in accordance with an exemplary embodiment of the present invention.

FIG. 7 is a flowchart illustrating a method for allocating communication resources using the VCS in accordance with an exemplary embodiment of the present invention. FIG. 7 illustrates an example of additionally employing shared channel resources according to an amount of data to be transmitted for a user.

In step 701 of FIG. 7, the transmitter of the BS allocates a dedicated channel by performing a scheduling process for allocating communication resources to a particular user linked through a radio network. Because the dedicated channel allocation is the same as described in FIG. 4, its detailed description is omitted for clarity and conciseness.

In step 703, the transmitter of the BS determines whether an amount of data to be transmitted to a user to which a dedicated channel has been allocated in a previous transmission interval is less than or equal to the capacity of the dedicated channel. If the amount of data to be transmitted to the user is less than or equal to the capacity of the dedicated channel, the data is transmitted using the dedicated channel as in the conventional CS scheme in step 705. On the other hand, if the amount of data to be transmitted to the user to which the dedicated channel has been allocated is more than the capacity of the dedicated channel in step 703, the transmitter of the BS additionally allocates shared channel resources to the associated user in step 707. In step 709, the transmitter of the BS transmits the data of the user on the pre-allocated dedicated channel and the shared channel allocated in step 707. Although not illustrated in FIG. 7, control information is transmitted on a shared control channel as in the conventional PS scheme because the shared channel is used in the data transmission for the associated user in step 709.

It should be noted that all users cannot use both the dedicated channel and the shared channel as in the exemplary embodiment of FIG. 7. That is, the user MS capable of using both the dedicated channel and the shared channel should determine whether its data is transmitted on the shared channel by continuously monitoring the shared control channel during a call connection. This user MS is selected in advance in the process for allocating the dedicated channel in step 701 of FIG. 7. After transmitting the data on the dedicated channel and/or the shared channel in step 705 or 709, the transmitter of the BS moves to the next transmission interval in step 711 and determines whether data to be transmitted to the associated user is present. Until a call is terminated, the above process is repeated.

Next, a reception method in the user MS using the VCS scheme of the present invention will be described with reference to FIG. 8.

Figure 8:
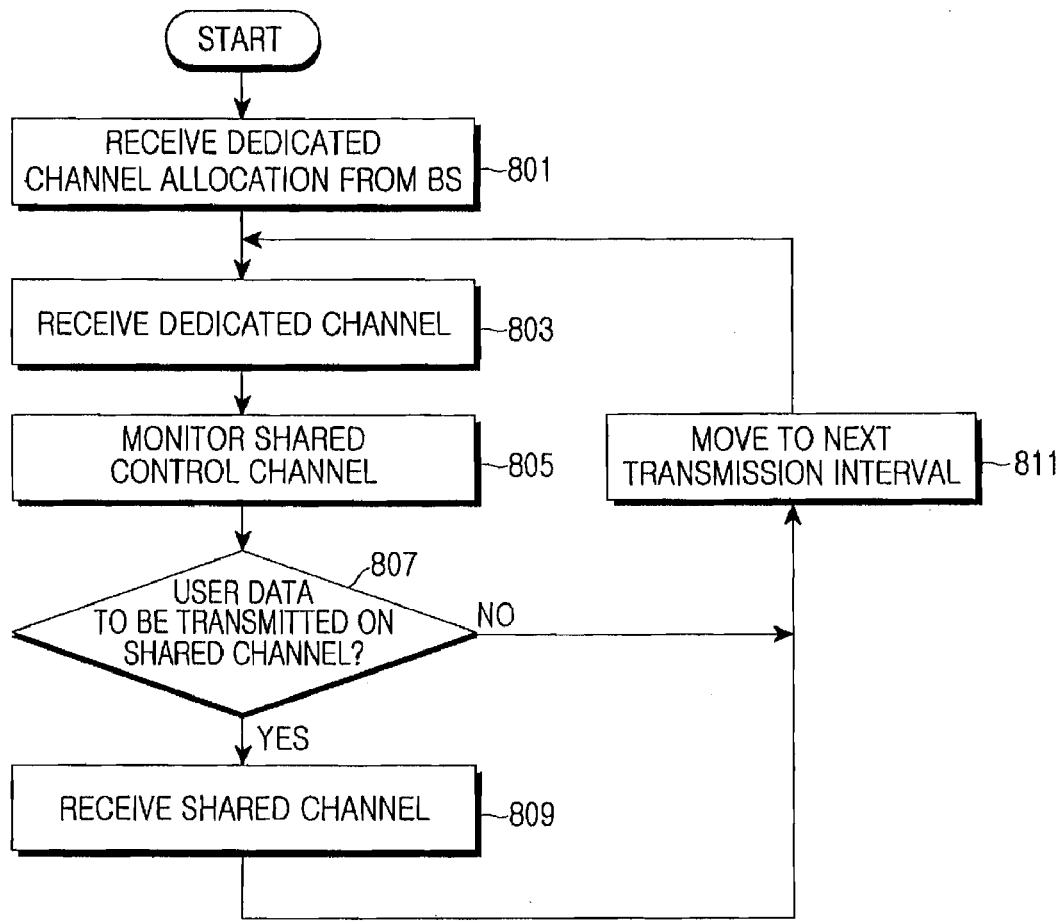
FIG. 8 is a flowchart illustrating a reception method in a mobile station using the VCS in accordance with an exemplary embodiment of the present invention.

FIG. 8 is a flowchart illustrating the reception method in the MS using the VCS scheme in accordance with an exemplary embodiment of the present invention.

In step 801 of FIG. 8, the user MS is assigned a dedicated channel by a BS. At this time, the BS sends, to the user MS, a message indicating whether the shared channel is supported in the channel allocation process. When the presence of the shared channel supported between the BS and the MS is predefined and the presence of the shared channel supported for the MS is preset, the BS can omit an operation for sending the message indicating whether the shared channel is supported for the MS in step 801. The user MS receives data using the allocated dedicated channel as in the conventional CS scheme and also determines whether its data is transmitted on the shared channel by continuously monitoring the shared control channel in step 805. For convenience of explanation, FIG. 8 illustrates the process for monitoring the shared control channel in step 805 after receiving the dedicated channel in step 803. However, it should be noted that the reception of the dedicated channel and the reception of the shared channel are independently performed.

Thus, the user MS continuously monitors the shared control channel to demodulate control information in step 805 and determines that its data is transmitted on the shared channel when a user Identifier (ID) is included in the control information in step 807. On the other hand, if the user ID is not included in the control information, the user MS determines that its data is not transmitted on the shared channel. When determining that the data of the user MS is transmitted on the shared channel in step 807, the user MS receives its data by demodulating the shared channel in an associated transmission interval in step 809. If the data of the user MS is absent and the reception of the shared channel is completed, the user MS moves to the next transmission interval in step 811 and then repeats the process from step 803 until a call is terminated.

Structures of the BS and MS to which the above-described communication resource allocation method and the reception method are applied will be described with reference to FIGS. 9 and 10.

Figure 9:
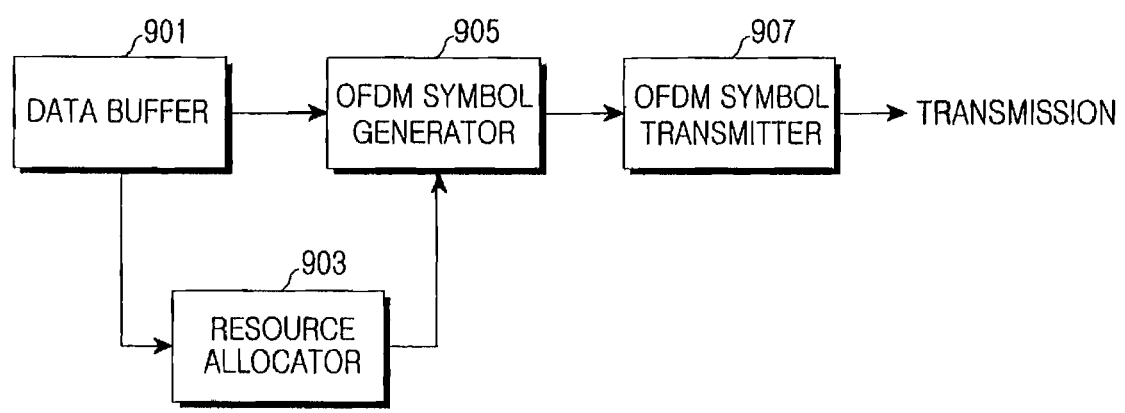
FIG. 9 is a block diagram illustrating a structure of a transmitter of a base station in accordance with an exemplary embodiment of the present invention.

FIG. 9 is a block diagram illustrating a structure of a transmitter of a base station in accordance with an exemplary embodiment of the present invention. FIG. 9 illustrates an example of a structure of a transmitter of the BS applied to a communication system using an Orthogonal Frequency Division Multiplexing (OFDM) transmission scheme.

In FIG. 9, a data buffer 901 temporarily stores data to be transmitted to each user in a downlink after receiving the data from a higher layer of a communication network. According to the capacity of storing data in the data buffer 901, a resource allocator 903 schedules data to be transmitted to each user and communication resources of each user for a data transmission. In an exemplary implementation, the scheduling operation of the resource allocator 903 is performed using the method of FIGS. 4 to 7. An OFDM symbol generator 905 receives transmission target data from the data buffer 901 and then generates OFDM symbols to be transmitted under control of the resource allocator 903. The OFDM symbol generator 905 can be configured with an encoder, interleaver, symbol mapper, and the like used in the OFDM system.

An OFDM symbol transmitter 907 inserts a Guard Interval (GI) into an OFDM symbol generated from the OFDM symbol generator 905 and then transmits the OFDM symbol to a radio network. Further, the OFDM symbol transmitter 907 transmits user-by-user data on associated radio channels in a designated transmission interval according to a scheduling result of the resource allocator 903. The OFDM symbol transmitter 907 is configured with a GI inserter, Radio Frequency (RF) processor, antenna, and the like.

The device of the BS of FIG. 9 is an example of the OFDM system. Those skilled in the art will appreciate that the resource allocator 903 using the method of FIGS. 4 to 7 is applicable to a device of a BS of a third-generation (3G) network or a transmitter of another communication network in which packet communication is possible.

Figure 10:
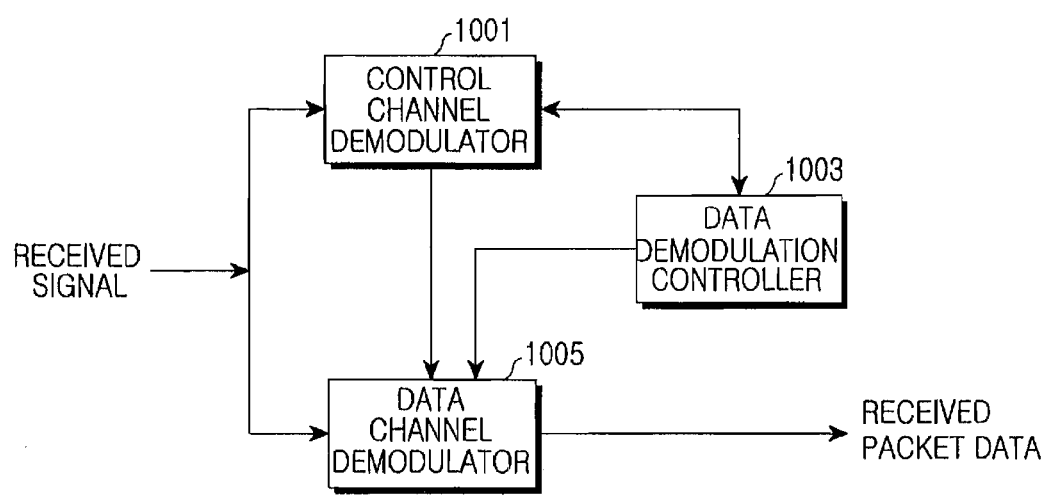
FIG. 10 is a block diagram illustrating a structure of a receiver of a mobile station in accordance with an exemplary embodiment of the present invention.

FIG. 10 is a block diagram illustrating a structure of a receiver of a MS in accordance with an exemplary embodiment of the present invention.

In FIG. 10, a control channel demodulator 1001 outputs control information from a downlink signal by demodulating a control channel in a predetermined process. Herein, the control information is for a shared channel including a user ID, resource information, data rate information, modulation information, coding information, and the like when the shared channel is used. The output of the control channel demodulator 1001 is input to a data demodulation controller 1003. The data demodulation controller 1003 controls the data channel demodulator 1005 to receive the dedicated channel and/or the shared channel as in the reception method of FIG. 8.

When the data demodulation controller 1003 determines that its data is transmitted on the shared channel according to a result of receiving the control information, it controls the data channel demodulator 1005 to demodulate a signal received from the shared channel in an associated transmission interval. Under control of the data demodulation controller 1003, the data channel demodulator 1005 demodulates and outputs a data channel allocated as the dedicated channel and/or the shared channel. In FIG. 10, the control channel demodulator 1001 and the data channel demodulator 1005 include a structure with a decoder, respectively.

Figure 11:
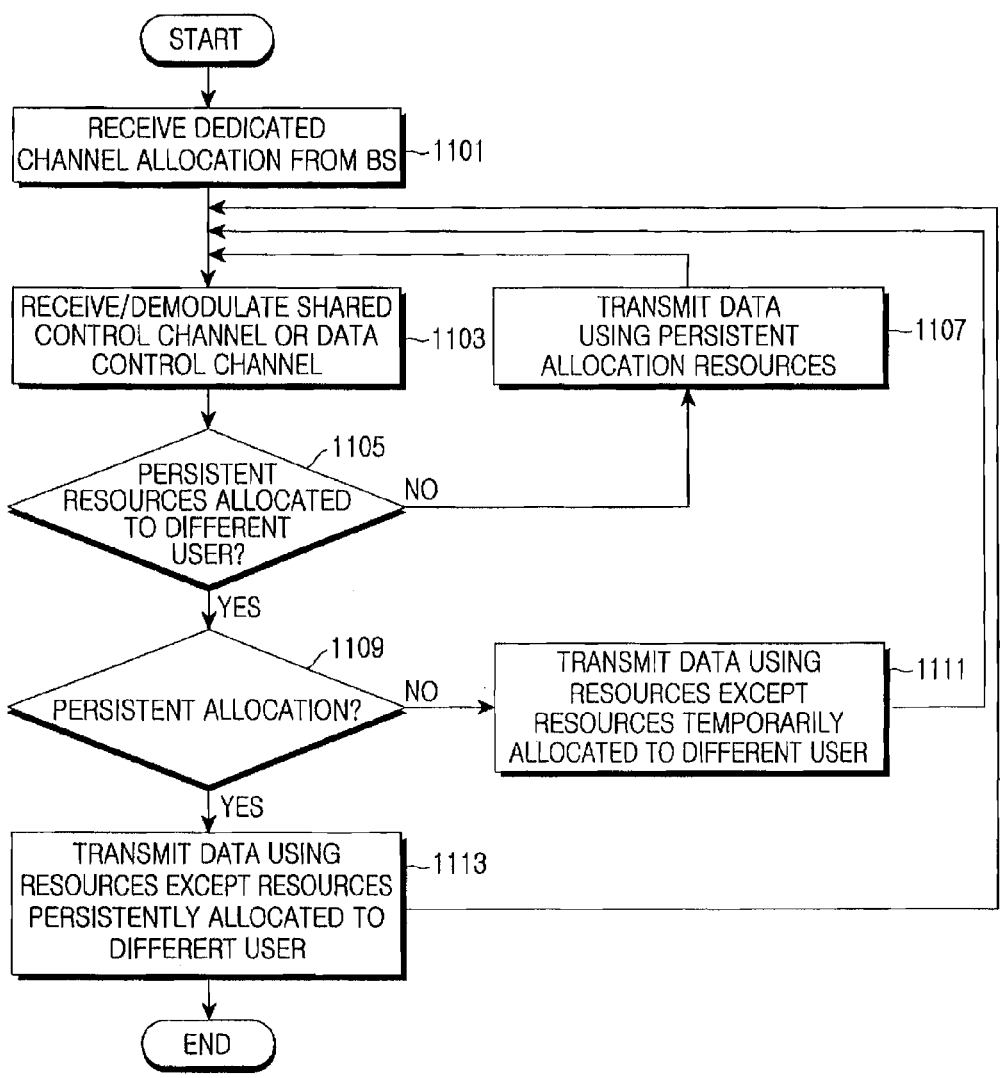
FIG. 11 is a flowchart illustrating a transmission method of a mobile station using the VCS in accordance with an exemplary embodiment of the present invention.

FIG. 11 is a flowchart illustrating a transmission method of a MS using the VCS scheme in accordance with an exemplary embodiment of the present invention. With reference to FIG. 11, an operation of the MS will be described when the method of the present invention is used for an uplink data transmission. It should be noted that the same method is available for the downlink data transmission.

In FIG. 11, the MS receives allocation of persistent resources, that is, a dedicated channel, from the BS in step 1101. The MS to which the persistent resources have been allocated receives and demodulates a shared control channel (or data control channel) in step 1103. The MS retrieves shared control information from the demodulated shared control channel and determines whether its allocated persistent resources are allocated to a different user according to the VCS scheme of the present invention in step 1105. If the persistent resources allocated to the MS are not allocated to the different user in step 1105, the MS determines that its allocated persistent resources are not changed and transmits data using the persistent resources in step 1107.

When the MS determines that its allocated persistent resources are allocated to the different user in step 1105, the MS retrieves shared control information from the shared control channel and determines whether resource allocation for the different user is persistent resource allocation in step 1109. When determining that the resource allocation for the different user is not the persistent resource allocation in step 1109, the MS proceeds to step 1111 to determine that the allocated persistent resources are not changed but are the remaining resources obtained by excluding resources temporarily allocated for the different user from the allocated persistent resources available to transmit data of the MS in an associated time. Thus, the MS transmits the data using the remaining resources.

When the MS transmits data using the remaining resources obtained by excluding the resources temporarily allocated for the different user from the allocated persistent resources available to transmit data of the MS in step 1111, a time interval in which the resources are allocated to the different user may be applied at an associated time point or may be a time interval defined for the shared control channel or a time interval preset between the BS and the MS. Further, the time interval may have a range from the unique frame boundary for the MS as indicated by reference numeral 603 of FIG. 6 to a start point of the next boundary.

On the other hand, if the resource allocation for the different user is determined to be the persistent resource allocation in step 1109, the MS determines that its allocated persistent resources are changed. That is, the MS determines that its new persistent resources are the remaining resources obtained by excluding the persistent resources allocated for the different user from the persistent resources currently allocated to the MS in step 1113. The MS transmits the data using the new persistent resources. At this time, it should be noted that the new persistent resources are continuously applied after a resource change is made. Then, the MS repeats the process from step 1103 in the next time interval (or slot).

A structure of the transmitter of the MS to which the transmission method of FIG. 11 is applied can be simply implemented using the structure of the receiver of the MS as described with reference to FIG. 10. For example, the control channel demodulator 1001 is maintained in the transmitter of the MS. In accordance with the present invention, the transmitter of the MS can be configured with a data modulation controller and a data channel modulator mapped to the data demodulation controller 1003 and the data channel demodulator 1005.

As is apparent from the above description, exemplary embodiments of the present invention can provide a method for allocating communication resources using the VCS scheme that can efficiently allocate and employ the communication resources by performing communication resource allocation using both the CS and PS schemes.

Further, exemplary embodiments of the present invention can increase system capacity by minimizing a waste of communication resources in a wireless communication system for frequently transmitting a small amount of traffic that is sensitive to a delay time.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for transmitting data in a Mobile Station (MS) of a wireless communication system, comprising:
   receiving, by the MS, allocation of resources for a dedicated channel to the MS from a Base Station (BS);
   monitoring a shared control channel and receiving control information for the data transmission;
   determining whether resources for the dedicated channel are allocated to a different MS while also allocated to the MS through the control information;
   transmitting data using remaining resources excluding the resources allocated to the different MS when the resources for the dedicated channel are allocated to the different MS; and
   transmitting data using resources including the resources allocated to the different MS after expiring the allocation of the resources for the dedicated channel to the different MS when the resources for the dedicated channel are allocated to the different MS while also allocated to the MS,
   wherein the control information comprises information indicating whether the resources for the dedicated channel are allocated to the different MS while also allocated to the MS.

2. An apparatus for transmitting data from a Mobile Station (MS) to a Base Station (BS) in a wireless communication system, comprising:
- a control channel demodulator for demodulating a downlink signal and receiving control information relating to a shared channel;
- a data channel modulator for modulating a signal to be transmitted to a radio channel and outputting the modulated signal; and
- a data modulation controller for determining whether resources for a dedicated channel are allocated to a different MS while also allocated to the MS through the control information and controlling the data channel modulator to transmit data using remaining resources excluding the resources allocated to the different MS when the resources for the dedicated channel are allocated to the different MS persistently, wherein the control information comprises information indicating whether the resources for the dedicated channel are allocated to the different MS while also allocated to the MS, and wherein the data modulation controller controls the data channel modulator to transmit data using resources including the resources allocated to the different MS after expiring the allocation of the resources for the dedicated channel to the different MS when the resources for the dedicated channel are allocated to the different MS while also allocated to the MS.

* * * * *